(12) United States Patent
Gao et al.

(10) Patent No.: US 12,032,887 B2
(45) Date of Patent: Jul. 9, 2024

(54) IN-GRAPH CAUSALITY RANKING FOR FAULTS IN THE DESIGN OF INTEGRATED CIRCUITS

(71) Applicant: Synopsys, Inc., Mountain View, CA (US)

(72) Inventors: Xiang Gao, San Jose, CA (US); Hsiang-Chieh Liao, San Ramon, CA (US); Chia-Chih Yen, Taipei (TW); Sashikala Venkata Obilisetty, Los Altos, CA (US)

(73) Assignee: Synopsys, Inc., Sunnyvale, CA (US)

( * ) Notice: Subject to any disclaimer, the term of this patent is extended or adjusted under 35 U.S.C. 154(b) by 249 days.

(21) Appl. No.: 17/669,307

(22) Filed: Feb. 10, 2022

(65) Prior Publication Data
US 2022/0261524 A1 Aug. 18, 2022

Related U.S. Application Data

(60) Provisional application No. 63/149,965, filed on Feb. 16, 2021.

(51) Int. Cl.
*G06F 30/33* (2020.01)
*G06F 30/31* (2020.01)
*G06F 30/3312* (2020.01)
*G06F 30/3323* (2020.01)
*G06F 30/398* (2020.01)
*G06F 119/12* (2020.01)

(52) U.S. Cl.
CPC .............. *G06F 30/33* (2020.01); *G06F 30/31* (2020.01); *G06F 30/3312* (2020.01); *G06F 30/3323* (2020.01); *G06F 30/398* (2020.01); *G06F 2119/12* (2020.01)

(58) Field of Classification Search
CPC ....................................................... G06F 30/33
USPC .......................................................... 716/111
See application file for complete search history.

(56) References Cited

U.S. PATENT DOCUMENTS

2006/0111873 A1 * 5/2006 Huang .................... G06F 11/27
714/E11.169

OTHER PUBLICATIONS

Kantipudi, K. R. "Controllability and Observability." Auburn University, ELEC7250-001 VLSI Testing, Spring 2005, Instructor: Professor Vishwani D. Agrawal, 2010, pp. 1-6.

* cited by examiner

*Primary Examiner* — Eric D Lee
(74) *Attorney, Agent, or Firm* — Fenwick & West LLP

(57) ABSTRACT

In some aspects, a graph is used to assist users in cause analysis of faults. The graph represents signal flow through a design of an integrated circuit The graph includes graph elements, such as nodes and edges. The nodes may represent cells and nets in the circuit design, and the edges may represent signal flow between the cells and nets. A propagation model for the propagation of faults through the graph is constructed. The propagation model includes local propagation models for the propagation of faults through the graph elements. Propagation of a known fault backward through the graph is modeled using the propagation model. This results in a causality ranking of the graph elements as possible causes of the known fault. Information indicative of the causality ranking is displayed in a user interface that shows the design of the integrated circuit.

20 Claims, 14 Drawing Sheets

IN-GRAPH CAUSALITY RANKING FOR FAULTS IN THE DESIGN OF INTEGRATED CIRCUITS

RELATED APPLICATION

This application claims priority under 35 U.S.C. § 119(e) to U.S. Provisional Patent Application Ser. No. 63/149,965, "In-Graph Causality Ranking for Faults in the Design of Integrated Circuits," filed Feb. 16, 2021. The subject matter of all of the foregoing is incorporated herein by reference in their entirety.

TECHNICAL FIELD

The present disclosure relates to causal analysis of faults in designs of integrated circuits.

BACKGROUND

In circuit design, finding the root causes of faulty signals or other faults can be challenging and labor intensive. The typical manual debugging process would start from the identified faults, then trace upstream and back in time, step by step, to examine for possible root causes. Whenever there are multiple possible causes, current electronic design automation (EDA) tools typically require user intervention without providing recommendations. As a result, the debugging process relies heavily on the debug engineer's experience and knowledge.

SUMMARY

In some aspects, a graph is used to assist users in cause analysis of faults. The graph represents signal flow through a design of an integrated circuit. The graph includes graph elements, such as nodes and edges. The nodes may represent cells and nets in the circuit design, and the edges may represent signal flow between the cells and nets. A propagation model for the propagation of faults through the graph is constructed. The propagation model includes local propagation models for the propagation of faults through the graph elements. Propagation of a known fault backward through the graph is modeled using the propagation model. This results in a causality ranking of the graph elements as possible causes of the known fault. Information indicative of the causality ranking is displayed in a user interface that shows the design of the integrated circuit.

Other aspects include components, devices, systems, improvements, methods, processes, applications, computer readable mediums, and other technologies related to any of the above.

BRIEF DESCRIPTION OF THE DRAWINGS

The disclosure will be understood more fully from the detailed description given below and from the accompanying figures of embodiments of the disclosure. The figures are used to provide knowledge and understanding of embodiments of the disclosure and do not limit the scope of the disclosure to these specific embodiments. Furthermore, the figures are not necessarily drawn to scale.

DETAILED DESCRIPTION

Figure 1:
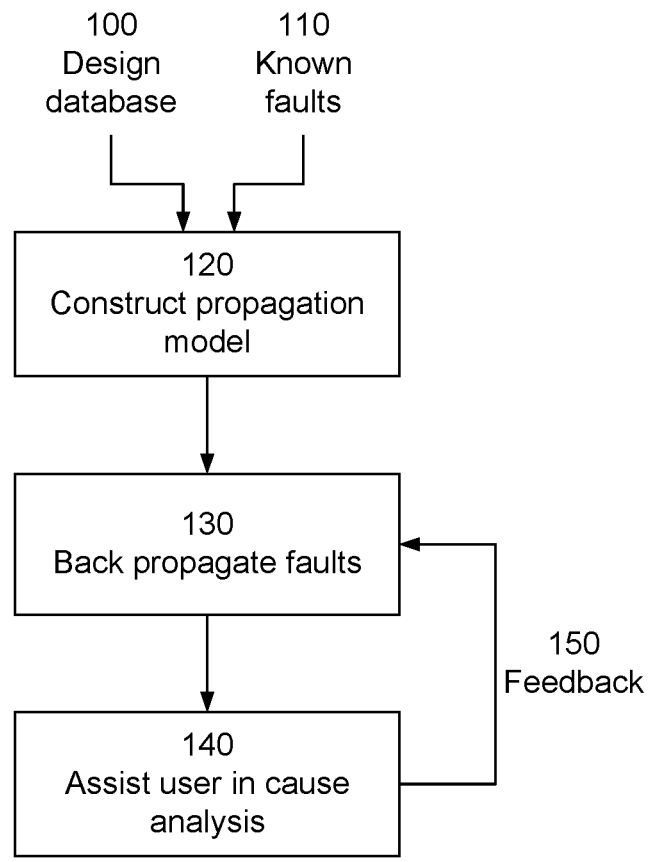
FIG. 1 illustrates a flowchart for causality ranking of possible causes for a fault, in accordance with some embodiments of the present disclosure.

Aspects of the present disclosure relate to in-graph causality information, such as causality rankings, for faults in the design of integrated circuits. In the circuit design process, the design of an integrated circuit may be represented in a form that contains information about how signals flow through the integrated circuit. During the design process, faults in the integrated circuit may be identified. The circuit design may be used to trace backward from the location of the fault to identify circuit elements that are possible upstream causes of the fault. However, there may be many possible causes for a fault and backward tracing alone does not provide significant information regarding which possible causes are more likely to be the actual cause for any particular fault or set of faults. Without more information, the user typically must manually explore the different possible causes to determine the actual root cause.

The approach described in this disclosure provides additional information about the possible causes, such as a relative ranking of different possible causes, thus providing some automated guidance to the user. For example, the system may provide a recommendation priority list of possible "hot spots" during the interactive debugging process, so that the user may first investigate the more likely causes.

The relative ranking is developed based on principles of statistical modeling. A graph represents the signal flow through the design of an integrated circuit. In the forward direction, given the probability that some upstream driver signal is faulty, a forward propagation model may be used to predict the probability that some downstream signal is also faulty. Given the probabilities of many different upstream faults, the relative probabilities of different downstream faults may be predicted (i.e., prior probability). This yields the fault rank, which is a measure based on the prior probability that a certain downstream signal is faulty, given probabilities that certain upstream driver signals are faulty.

A similar approach may be used in the backward direction. Given the probability that some downstream signal is faulty, a back propagation model may be used to predict the probability that upstream driver signals are faulty. Given that a set of downstream faults have occurred (probability of fault=1), the back propagation model may be used to predict the relative probabilities of different upstream causes. This yields the cause rank, which is a measure based on the conditional probability that a certain upstream driver signal is faulty, given probabilities that certain downstream signals are faulty.

The ranking of possible root causes may then be based on both the fault rank and the cause rank. For convenience, this is referred to as the joint rank. The joint rank is a measure of the joint probability that upstream signals and downstream signals are both faulty. In one approach the joint rank is calculated as fault rank multiplied by cause rank. Note that although the fault rank, cause rank and joint rank are based on probability concepts, they need not be probabilities, strictly speaking. For example, true probabilities will sum to 1, but that is not necessarily the case for the different ranks. The ranks are a relative measure of estimated probabilities.

Both the back propagation model and the forward propagation model may include local models, for example that describe the propagation of faults through a single node in the graph. These models, both individually and collectively, may also be trained using machine learning techniques. The techniques may be described as "in-graph" because the nodes and edges used by the model are based on the design of the integrated circuit design. Relevant data (design files, log files, etc.) may be combined to train common (in-graph) machine learning models. The common models and/or their parameters may be used for the current design under debug. For example, the common model and/or parameters may be as the starting model or as seed values of model parameters for the specific in-graph model for the current design. Alternatively, they may be used as is without any further training, or used in combination with the specific in-graph model for the design under debug.

Advantages of this approach include providing automated guidance to the user regarding possible causes. As a result, the user may investigate more likely causes first, which may reduce the time required to determine the root cause of faults. The automated approach may also be based on in-graph machine learning models. The in-graph aspect uses existing information about the circuit design, thus saving timing and computational resources to develop and train the underlying models.

FIG. 1 depicts a flowchart for causality ranking of possible causes for a fault. A design database 100 contains a design of an integrated circuit. The design database includes a description of the cells and nets of the integrated circuit and how they are connected to each other. This may be represented in the form of a graph. For example, the nodes of the graph may represent the cells and nets in the integrated circuit, and the edges may represent the connections between these elements. The user is trying to determine the cause(s) of a set of known faults 110. For example, the faults 110 may be generated during functional verification and represent errors in the functioning of the integrated circuit.

A propagation model for the propagation of faults through the graph is constructed 120. The propagation model includes local propagation models for the propagation of the fault through the graph elements. The propagation model may include both forward propagation and back propagation models. For example, different local back propagation models may be developed for the back propagation of faults through different types of cells and nets. The known faults are propagated 130 backward through the graph, thus providing relative causality ranking (such as joint ranks) for different possible root causes. The resulting causality rankings are used to assist 140 the user in debugging the design. For example, the user may be provided with a prioritized list of possible causes. In some cases, the user's input or debug activities 140 may be used as feedback 150 to improve the propagation model.

Figure 2A:
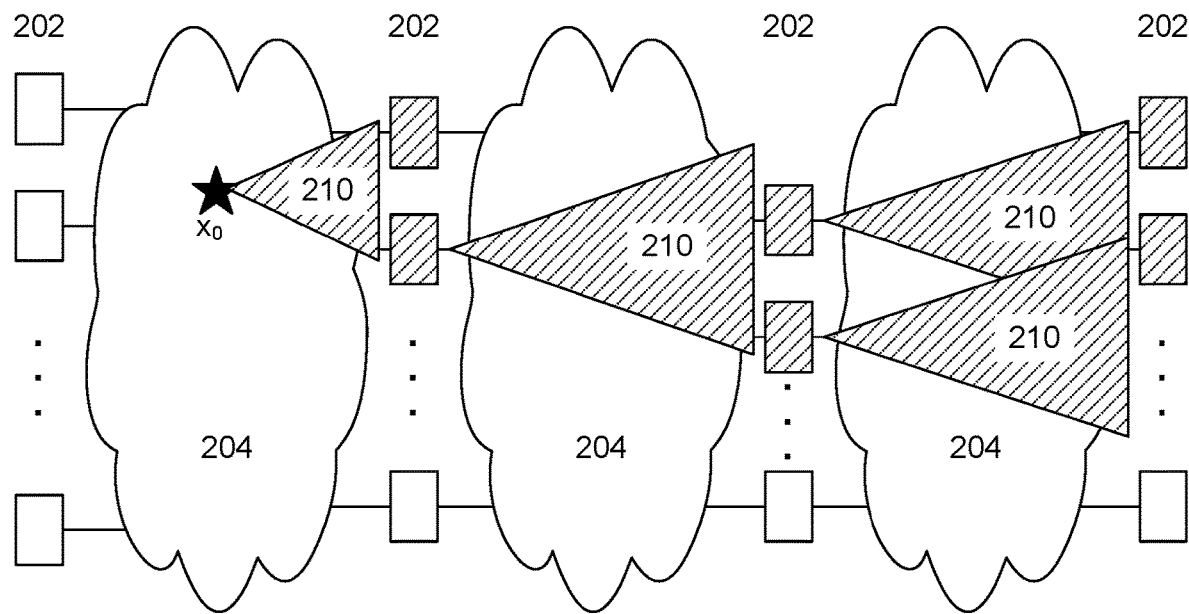
FIGS. 2A and 2B are diagrams illustrating causality ranking based on forward and backward propagation of faults, in accordance with some embodiments of the present disclosure.
Figure 2B:
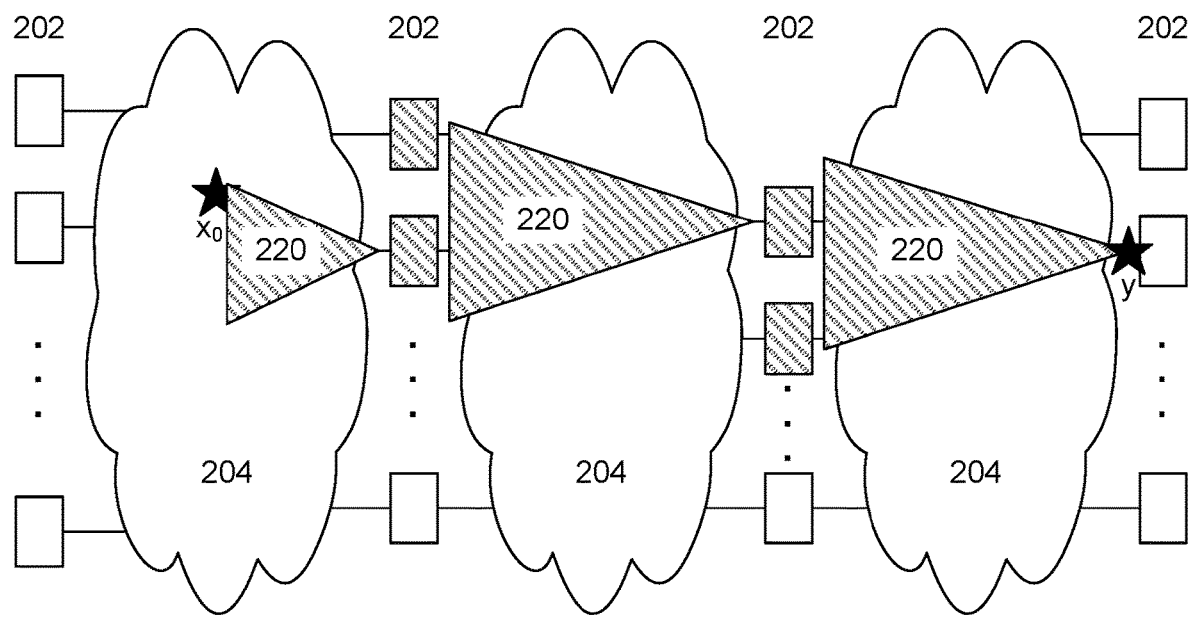

FIGS. 2A and 2B are diagrams illustrating causality ranking based on forward and backward propagation of faults. Both figures show a circuit design with sequential logic circuits connected by combinational logic. The sequential logic circuits are represented by rectangles 202 and the combinational logic is represented by clouds 204. Signals propagate through the circuit elements, which include the combinational logic, the sequential logic and the nets connecting them. For convenience, signals will be referred to as $x_i$. In FIG. 2A, signal $x_0$ is faulty. This fault propagates forward as shown by the cones 210 to affect the circuit elements and signals within these cones. That is, the circuit elements within these cones will also carry faulty signals. Generally speaking, a faulty signal $x_i$ at a certain circuit element may also be the result of a fault from a source other than faulty signal $x_0$.

In FIG. 2B, the fault is detected at signal y. The user would like to find the root cause $x_0$ of this fault. Working backward, the fault at location y may have come from any of the circuit elements and signals within any of the cones 220. That is, the fault may be propagated backward to the signals $x_i$ within the cones 220.

In one approach, the occurrence and propagation of faults is modeled based on statistical principles. Let $p(x_i)$ be the probability that a fault is present at location $x_i$. The joint probability $(y,x_i)$, which is the probability that a fault is present at both locations y and $x_i$, is a measure of fault correlation between the two locations. If a fault at y is detected, then those locations $x_i$ with higher joint probability $p(y,x_i)$, may be more likely to be causes of the fault at y, and the user may want to start their debug process with these locations. The joint probability $p(y,x_i)$ may be calculated as $$p(y,x_i)=p(y|x_i)p(x_i) \qquad (1)$$

where $p(y|x_i)$ is the conditional probability of a fault at y given a fault at $x_i$, and $p(x_i)$ is the prior probability of a fault at $x_i$.

However, it can be difficult to estimate these actual probabilities, particularly given designs with millions of circuit elements and joint probabilities that include many, many circuit elements. Instead, the approach described below estimates relative ranking of these quantities according to:

$$\text{joint rank} = (\text{cause rank}) \times (\text{fault rank}) \quad (2)$$

where cause rank is a measure indicative of the conditional probability $p(y|x_i)$ and fault rank is a measure indicative of the prior probability $p(x_i)$, so that joint rank is some indication of the joint probability $p(y,x_i)$. The joint rank may then be used to rank which circuit elements $x_i$ are more likely causes of a given faulty, thus assisting the user in their debug of the circuit.

In one approach, the cause rank and fault rank are calculated based on local propagation models for the propagation of faults through one circuit element at a time. In the forward direction, if the fault rank of the input signals is known, then the local forward propagation model may be used to calculate the fault rank for the output signals. In the backward direction, if the cause rank of the output signals is known, then the local back propagation model may be used to calculate the cause rank for the inputs signals. Local models are advantageous because they simplify and reduce the calculations and also reduce the storage required for the results.

The fault rank score for different elements may be computed by following the signal (forward propagation) and is primarily influenced by the circuit topology. However, to compute the cause rank score, the system may start from the identified faulty signal and trace against the signal path (back propagation) to upstream driver signals. This cause rank may then be updated whenever the identified faults are updated, so it can actively follow a debug engineer's action and inputs. New faulty signals may be evaluated as either cause rank=1 (if fault) or 0 (if non-fault). Floating numeric values may also be used for probability of being faulty. Information may be collected to update the in-graph local models to better serve debug engineers.

This approach can produce a measure of conditional probability (the cause rank) without costly simulations. It can also avoid expensive forward computation by using efficient back propagation. It can estimate the joint probability ranking (causality rank based on fault rank and cause rank) for different fault generation and propagation scenarios. It may be efficiently computed and incorporated into existing EDA tools.

The cause rank score is a measure of conditional probability of fault based on the circuit topology. It can be used to give designers a causality ranking estimation not only at the gate level but also on HDL designs. This information would help designers in multiple ways, not just for debugging. It can also provide needed assistance for complicated integrated circuits, where human intuition is not enough.

The joint probability ranking (causality ranking) may be displayed in an interactive system, which can update the causality ranking scores based on dynamically confirmed faults during debug.

This approach may also incorporate collected root cause analysis results, such as detected faults and their root causes. The ranking of the overall graph would reflect the collected data. This may be an in-graph machine learning approach. The collected data could be from different versions of the same design file (e.g., different design iterations of a single chip), from related design files (e.g., designs within a chip family), or from non-related design files (e.g., different chips within a same process technology).

For signals that are not confirmed, the rank scores can either be set to 0.5 or to NaN (not a number). Alternatively, the user can provide the best estimate based on experience.

The in-graph machine learning approach fits well with cause rank, and the interactive information with the debug engineer can be collected and refined to produce better recommendations. The recommendation system can also learn better predictions, via user inputs (i.e., user's update on circuit graph).

This approach treats "fault" and "cause" from a statistical perspective. A "fault" is an event when a signal behaves differently from the expected value, and it can happen in many different forms anywhere in the circuit topology. Confirmed faults capture a subset of all possible states of the graph, where the states can be described in terms of probability. The probability of a driver signal being the cause of a given set of confirmed faults, can be defined as the probability that the driver signal can produce the same confirmed fault states among all possible fault-producing scenarios.

However, although the system is based on concepts of "fault" and "cause" from a statistical perspective, the system does not attempt to calculate the actual probabilities of faults and causes for all circuit elements. Instead, the system relies on assumptions about how fault might happen in the circuit design and how probabilities propagate through the circuit design, and then builds statistics-based models from them. Assumptions may include the following:

1) A netlist is a two-partite directed graph consisting of cells and nets as the graph elements. A cell is a logic functional element, such as AND-gate, flip-flop, etc. A net carries the signal, such as a metal wire, bus, etc.
2) Most of the typical faults that designers encounter can be traced back in time and against the signal path with a small number of causes in proximity and, ultimately, the real "root" cause can be found by tracing back, step by step.
3) A fault can be caused by many scenarios: wrong signal value, incorrect graph topology, etc. and the cause ideally would be the "minimal" (or close to it) fix to correct the graph, etc. The root cause or fix is up to the designer's interpretation. So, a probability value for fault or root cause, etc. is valid in a relative sense, not in an absolute sense.
4) A fault is an event that can start from any cell or net, with the same (or different) prior probability, p=d, for the same element type. The exact value of d may not be available. However, it does not significantly affect the relative rankings of cells and nets, while the graph topology plays a larger role in the rankings.
5) A fault once generated will propagate with certain probability on all its targets, but the final ranking score, p(x), of the graph elements would be different based on the netlist topology as following 6) and 7).
6) The probability of fault, p(x), can be approximated by a "flow" like quantity that can propagate on the netlist graph, and the steady state fault rank score, would be determined by the in-graph model and network topology, etc.
7) A conditional probability p(y|x), for a given source x, and y driven by signal x, can be computed, by propagating p(x)=1 as 'fault rank' along the netlist, from x to y. The resulting fault rank at y, would be p(x,y)=p(y|x) *p(x), so conditional probability p(y|x), can be obtained via forward computations. But this approach requires computations on all circuit graph elements and is expensive.

In some cases, the system creates a fault rank as a measure of the prior probability of fault, p(x). Here, the system evaluates conditional probability p(y|x) and joint probability p(x,y) (or measures cause rank and joint rank) when a faulty (or faults) is confirmed during debugging.

Given $x^0$ as an observed signal at a circuit element, with $p(x^0)$, and there is a confirmed fault at $p(x^i)=1$, to evaluate the joint probability $p(x^0, x^i)$, the system could evaluate all possible sequences of events that leads from $x^0$ to $x^i$, such as $x^0, x^1, \ldots, x^i$. The computation can be carried out as:

$$p(x^0, x^i) == \sum_{x^j, j=1,\ldots,i-1} p(x^i, x^{i-1}, \ldots, x^0) = \quad (3)$$

$$\sum_{x^j, j=1,\ldots,i-1} p(x^i \mid x^{i-1}, \ldots, x^0) p(x^{i-1}, \ldots, x^0) =$$

$$\sum_{x^j, j=1,\ldots,i-1} p(x^i \mid x^{i-1}, x^{i-2}, \ldots, x^0)$$

$$p(x^{i-1} \mid x^{i-2}, \ldots, x^0) \ldots p(x^2 \mid x^1, x^0) p(x^1 \mid x^0)$$

Direct computation of the joint probability in Eq. 3 for all possible root causes of known faults can be very expensive. Instead, the system approximates it via a back propagation from the fault.

Figure 3A:
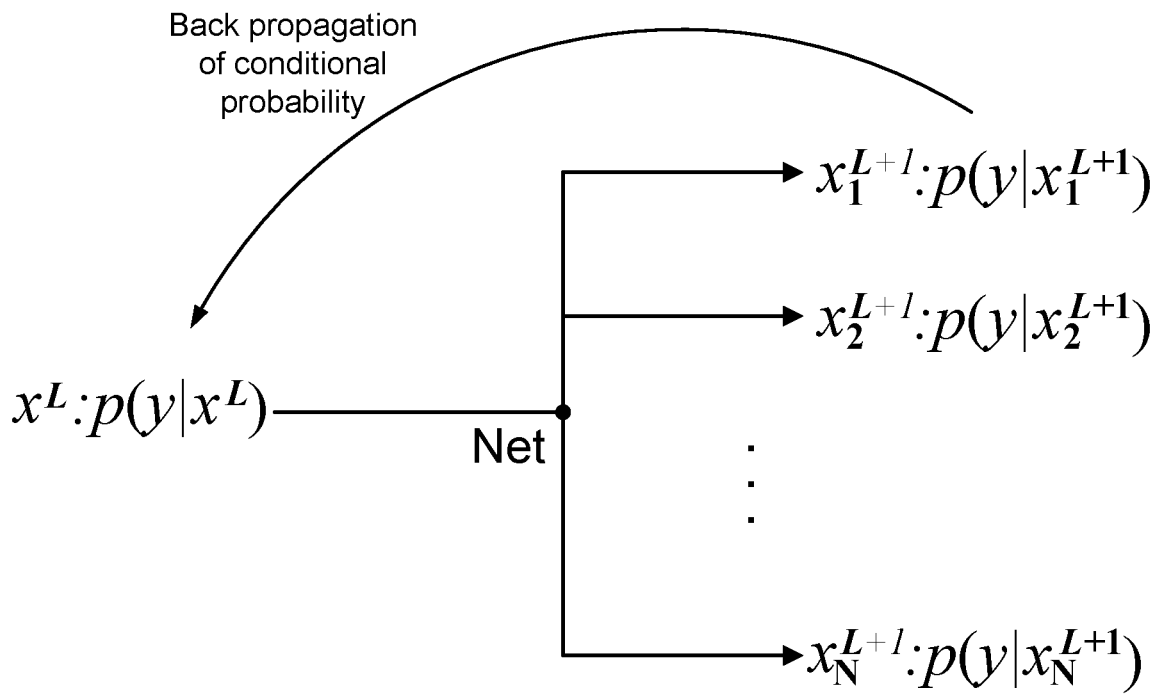
FIG. 3A illustrates the back propagation of conditional probability for a net, in accordance with some embodiments of the present disclosure.
Figure 3B:
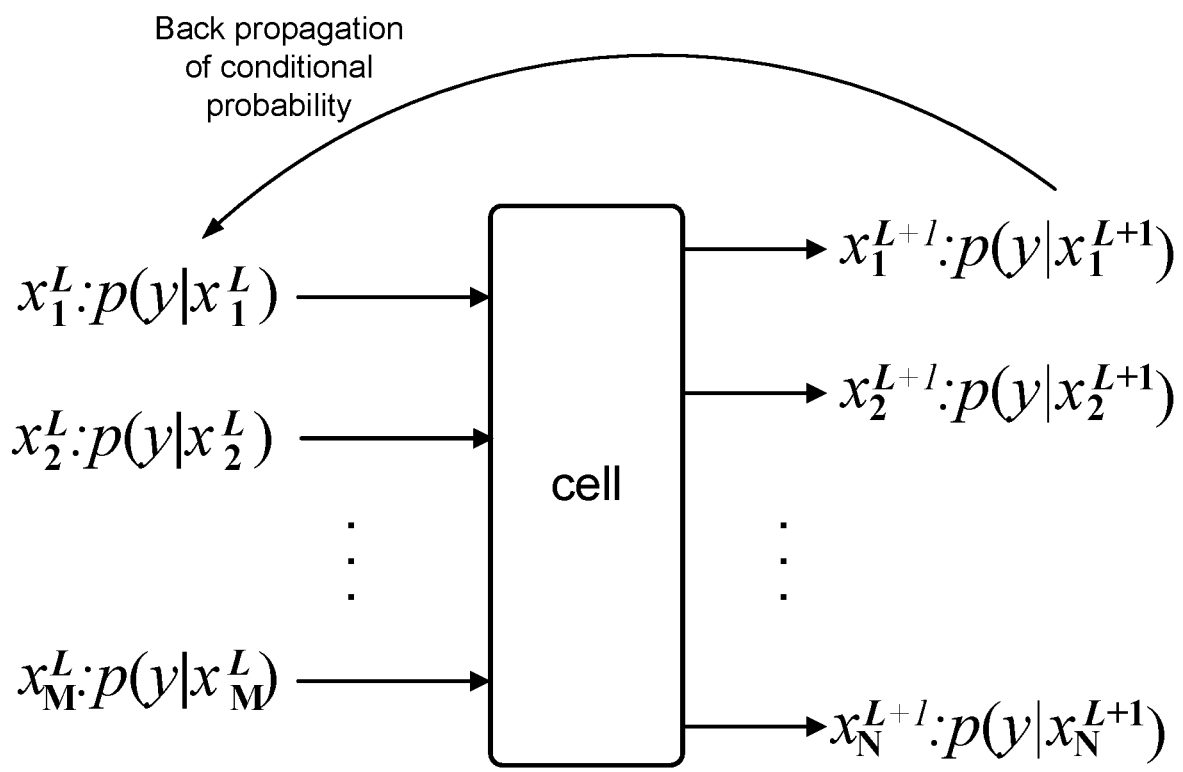
FIG. 3B illustrates the back propagation of conditional probability for a cell, in accordance with some embodiments of the present disclosure.

FIGS. 3A and 3B give examples of efficient computation of conditional probability via back propagation. In these simple examples, the system assumes that different types of standard cells, such as AND gate, NAND gate, all have the same back propagation mechanics and use the same back propagation model. That is, the same back propagation models are used for cells and nets with the same number of inputs and outputs. In practice, different back propagation models may be used for different type of circuit elements, or even different instances of the same type of circuit element. Also, hierarchical models based on the original circuit graph can be used.

FIG. 3A illustrates the back propagation of conditional probability for a branching net. In this model, a single signal $x^L$ comes into the net and is branched into N output signals $x^{L+1}$. Here, the superscript indicates the propagation layer. Signals from layer L propagate to layer L+1 and so on. If the conditional probabilities $p(y|x^{L+1})$ for the N output signals are known, the conditional probability $p(y|x^L)$ for the input signal may be estimated according to the model:

$$p(y \mid x^L) = \sum_{j=1,N} p(y \mid x_j^{L+1}) \quad (4A)$$

FIG. 3B illustrates the back propagation of conditional probability for a cell. In this model, M input signals $x^L$ enter the cell and N output signals $x^{L+1}$ leave the cell. If the conditional probabilities $p(y|x^{L+1})$ for the N output signals are known, the conditional probability $p(y|x^L)$ for each input signal may be estimated according to the model:

$$p(y \mid x_i^L) = \frac{1}{M} \sum_{j=1,N} p(y \mid x_j^{L+1}) \quad (4B)$$

The back propagation starts with confirmed faults by setting the conditional probability at those locations to 1, and then back propagates the conditional probability to the drivers of the fault location. The resulting values of p( ) are referred to as cause rank values, because they are not true conditional probabilities. They are measures of conditional probability because: 1) the true value of conditional probability for each cell is not trackable, 2) when combining the "flow" from multiple cells during back propagation, such as loops, these values could exceed 1, so cause rank value can be interpreted as a relative ranking score of the conditional probability.

Figure 4A:
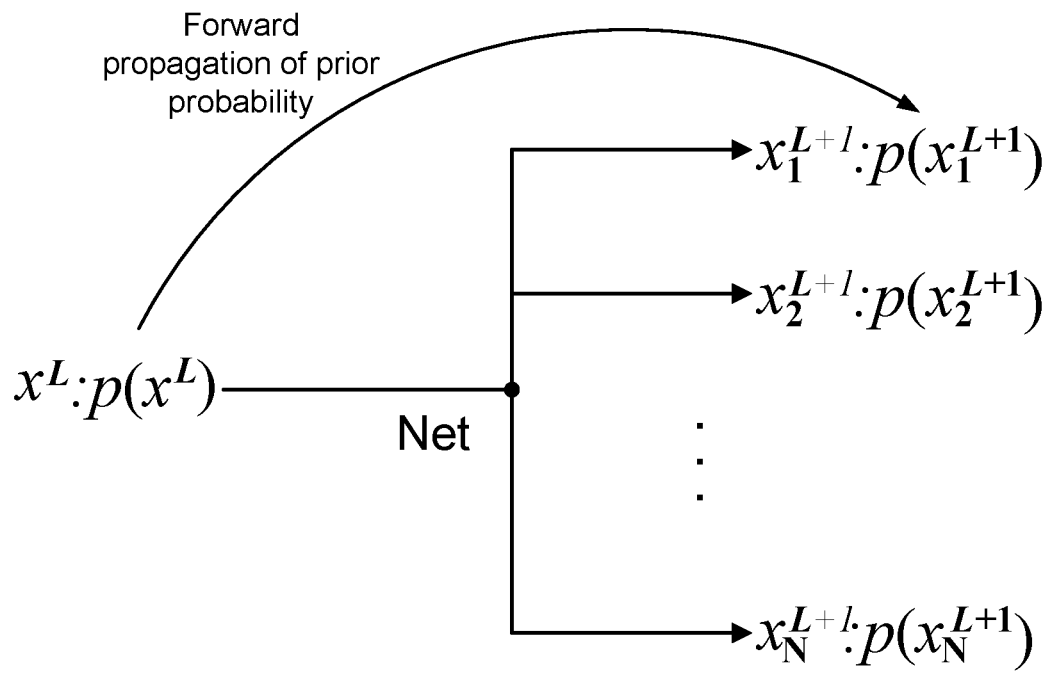
FIG. 4A illustrates the forward propagation of prior probability for a net, in accordance with some embodiments of the present disclosure.
Figure 4B:
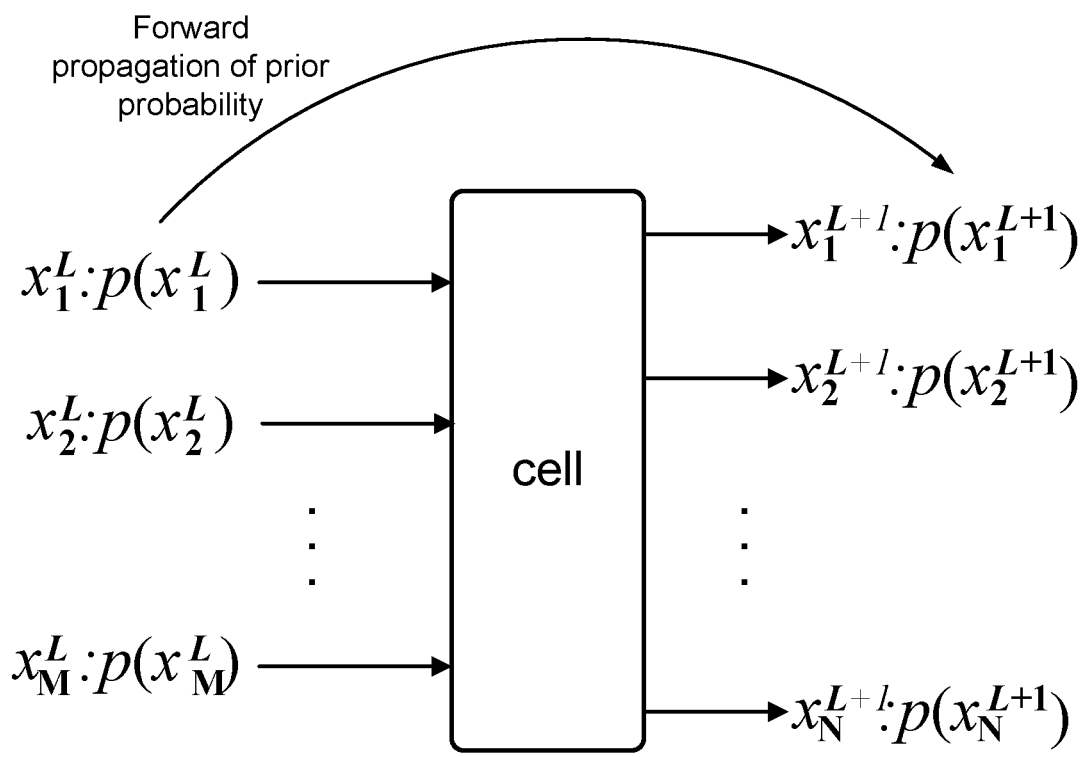
FIG. 4B illustrates the forward propagation of prior probability for a cell, in accordance with some embodiments of the present disclosure.

FIGS. 4A and 4B give examples of efficient computation of prior probability via forward propagation. In these simple examples, the same forward propagation models are used for cells and nets with the same number of inputs and outputs. FIGS. 4A and 4B use the same net and cell as FIGS. 3A and 3B, respectively, but the propagation of the prior probability p(x) is in the forward direction. If the prior probability $p(x^L)$ of each input signal is known, these forward propagation models then calculate the prior probability $p(x^{L+1})$ for each output signal. In FIG. 4A, the prior probability $p(x^{L+1})$ for each output signal may be estimated according to the model:

$$p(x^{L+1}) = \frac{1}{N}[d + (1-d)p(x^L)] \quad (5A)$$

Here, d is a damping factor. In FIG. 4A, the prior probability $p(x^{L+1})$ for each output signal may be estimated according to the model:

$$p(x_i^{L+1}) = \frac{1}{N}\left[d + (1-d)\frac{1}{M}\sum_{j=1}^{M} p(x_j^L)\right] \quad (5B)$$

The forward propagation may start by setting p( ) to the same value for all inputs. The resulting values of p( ) are referred to as fault rank values because they approximate the prior probability. The fault rank value can be interpreted as a relative ranking score of the prior probability.

The fault rank and cause rank values may then be used to calculate the joint rank, for example according to Eq. 2 above. This is a measure indicative of the joint probability of fault, which can be a good metric to evaluate the probability of root cause. In FIG. 2B, the joint rank may be computed for different circuit elements within cones 220. The joint rank may then be used to assist the user in their debugging process.

Figure 5A:
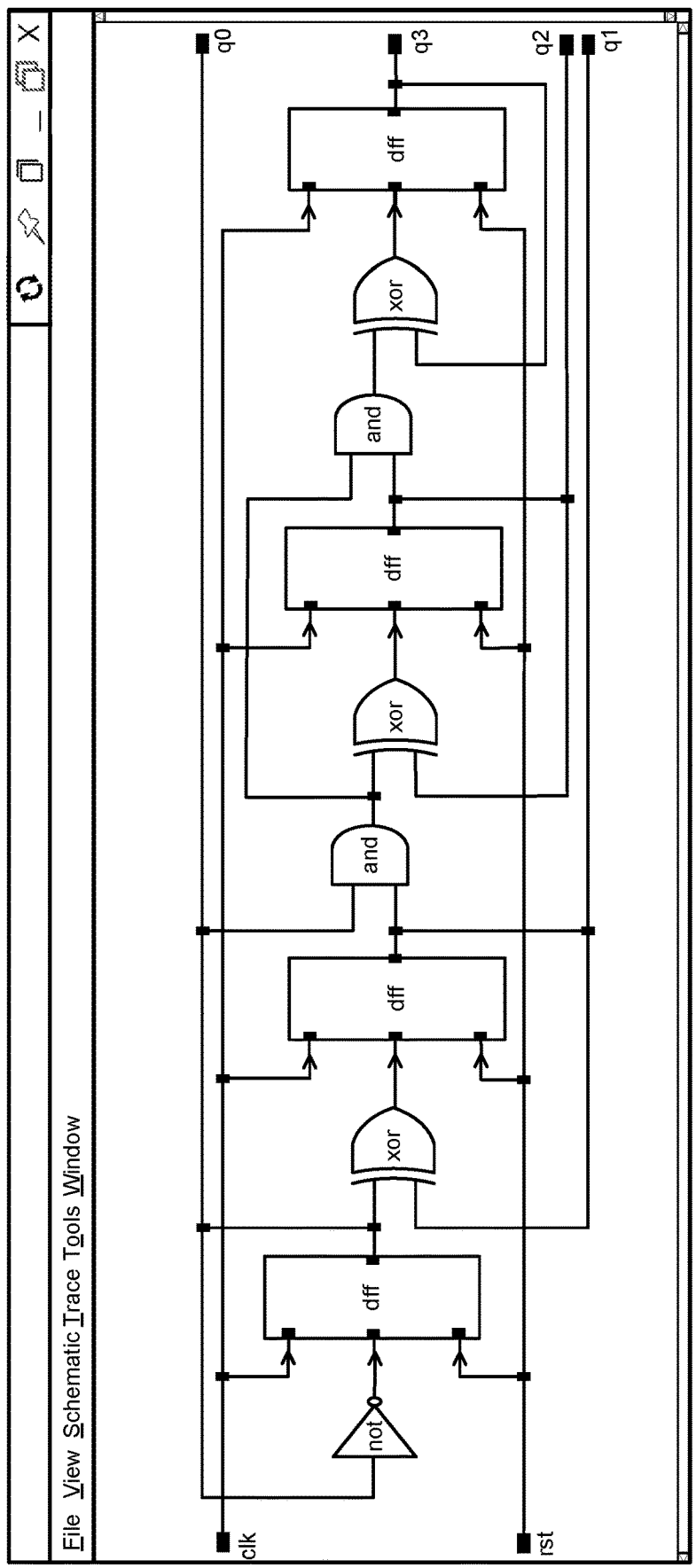
FIG. 5A is a screen shot of a circuit schematic of a 4-bit counter, in accordance with some embodiments of the present disclosure.

FIGS. 5A-5F show an example using a 4-bit counter. FIG. 5A is a screen shot showing a schematic of the counter, which has clk (clock) and rst (reset) as inputs on the left, and bits q0-q3 as outputs on the right. The outputs represent a 4-bit number which counts up with each clock tick. The rst input resets all the output bits to 0. The counter includes four D flip-flops, which are labeled dff in FIG. 5A. Each D flip flop has a d input (center left port) and q output (right port), as well as clk input (top left port) and rst input (bottom left port). The flip-flops are connected by combinational logic as shown in FIG. 5A.

Figure 5B:
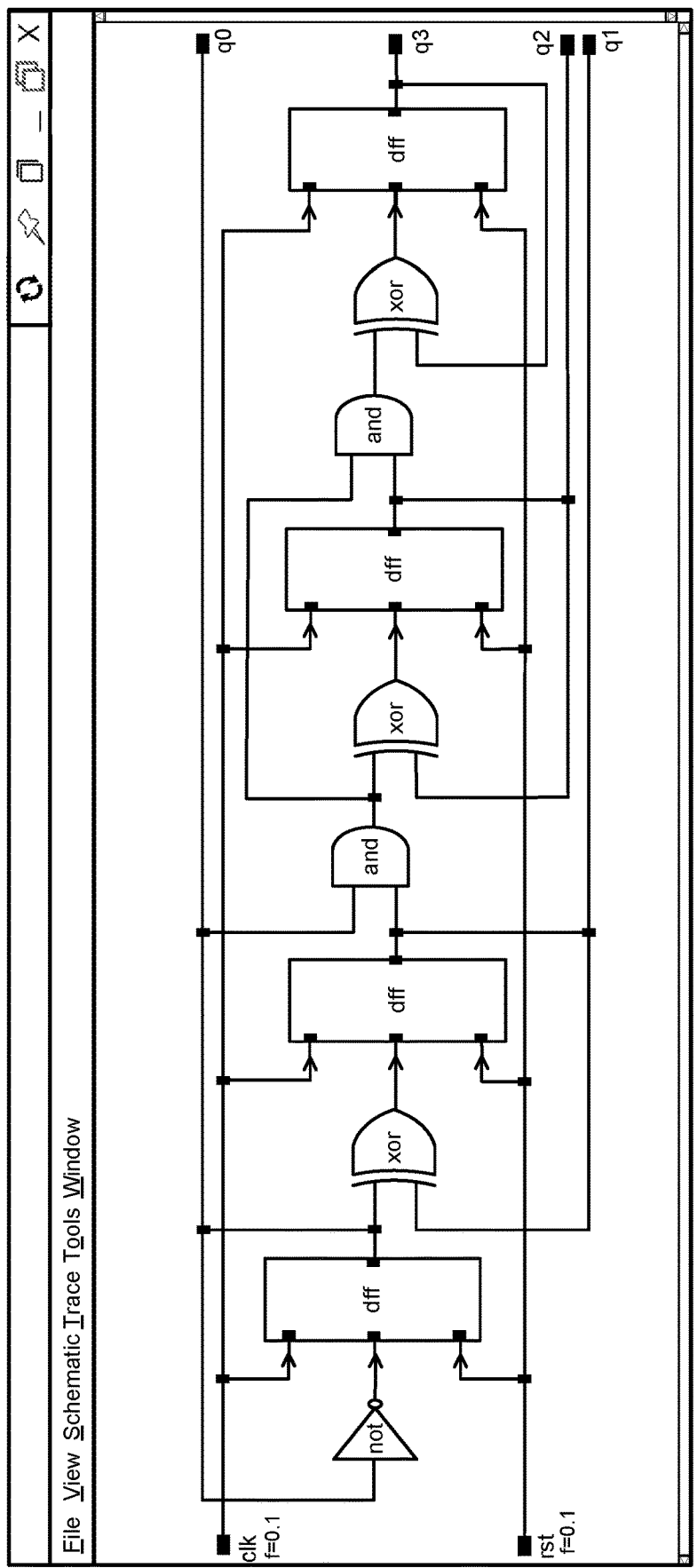
FIG. 5B is a screen shot showing forward propagation of fault rank through the 4-bit counter of FIG. 5A, in accordance with some embodiments of the present disclosure.

FIG. 5B shows forward propagation of the fault rank score "f" through the graph. The drivers clk and rst are initialized with a fault rank score of f=0.1 as shown in FIG. 5B. The fault rank score is then propagated forward through the graph using a forward propagation model, such as shown and described in FIGS. 4A and 4B above.

Figure 5C:
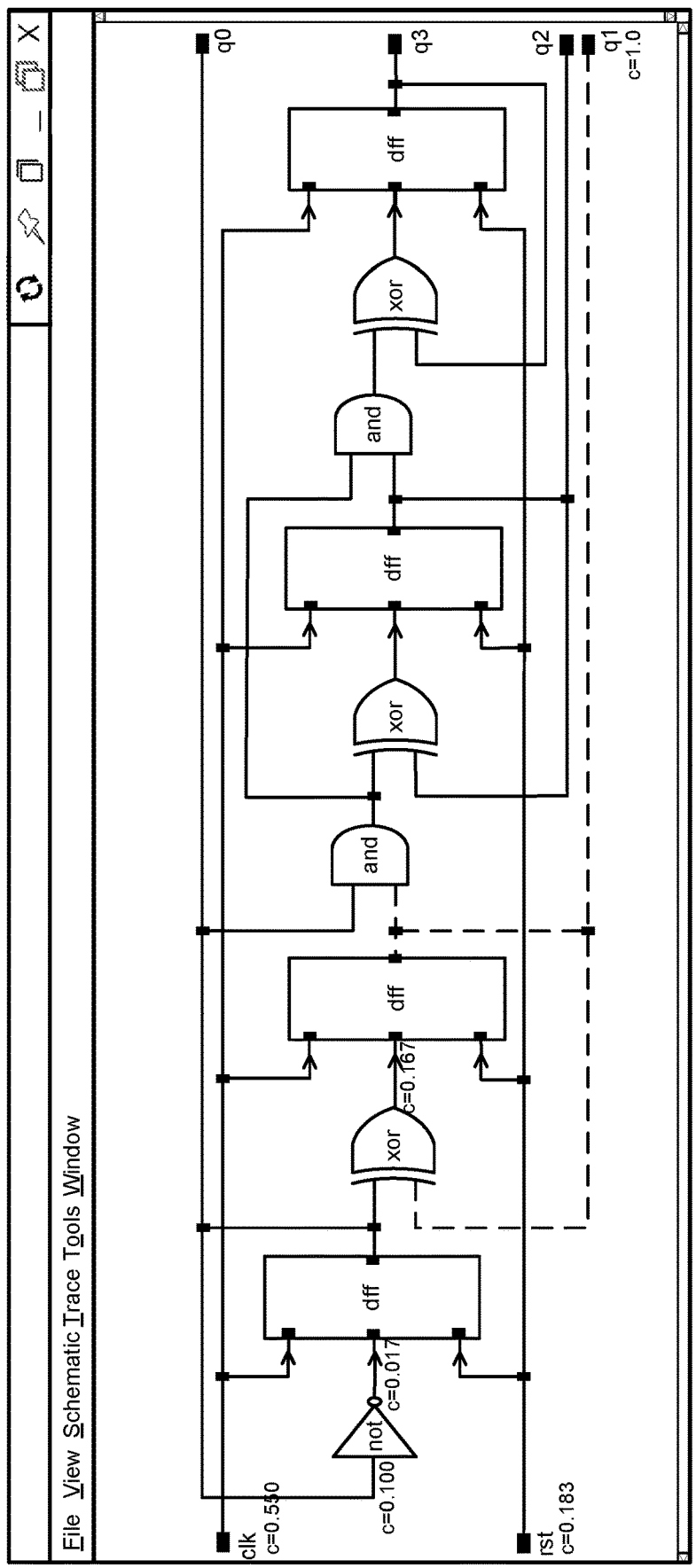
FIG. 5C is a screen shot showing back propagation of cause rank through the 4-bit counter of FIG. 5A, in accordance with some embodiments of the present disclosure.

FIG. 5C shows back propagation of the cause rank score "c" through the graph. In this example, the output signal q1 is identified as faulty, as indicated by the dashed line. The cause rank c is set to 1 for this signal. The cause rank is then back propagated to driver nodes, for example using the back propagation model described above. The screen shot in FIG. 5C displays the cause rank scores c for various signals in the backwards propagation path. In this example, the back propagation results in cause rank scores of c=0.550 for clk and c=0.183 for rst.

Figure 5D:
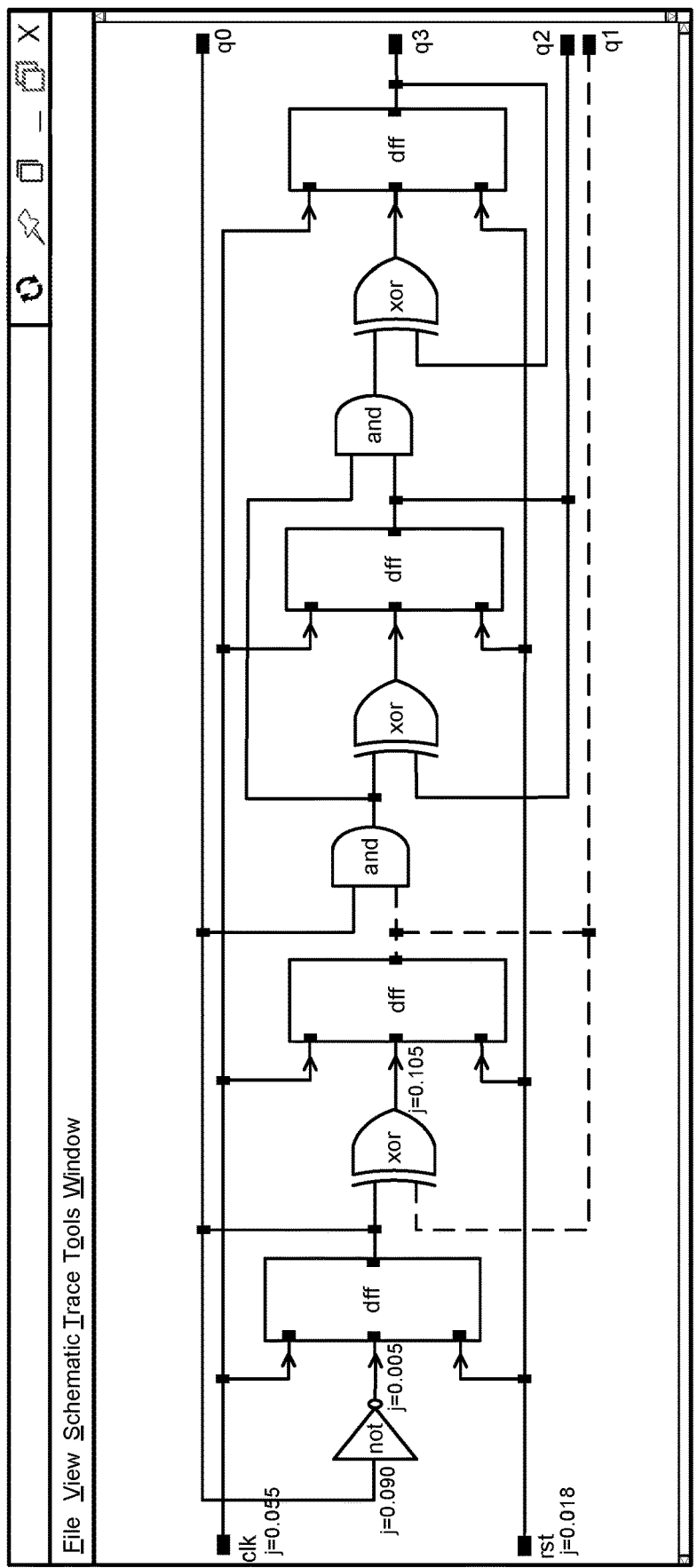
FIG. 5D is a screen shot showing joint rank for the 4-bit counter of FIG. 5A, in accordance with some embodiments of the present disclosure.

FIG. 5D shows the joint rank j, which is the multiplication of the fault rank of FIG. 5B and the cause rank of FIG. 5C.

Notice that the flip flops have feedback closed loops that would skew the fault rank and cause rank scores. That can be either mitigated by removing the feedback loop back to the flip flop, or showing the score as is. In this example, the system shows the score as is. The ranking scores in FIG. 5D capture the basic intuitions regarding causality of faults. The more complicated signal path has higher probability of fault, and paths that are close to the fault are more likely to be the cause of the fault.

Figure 5E:
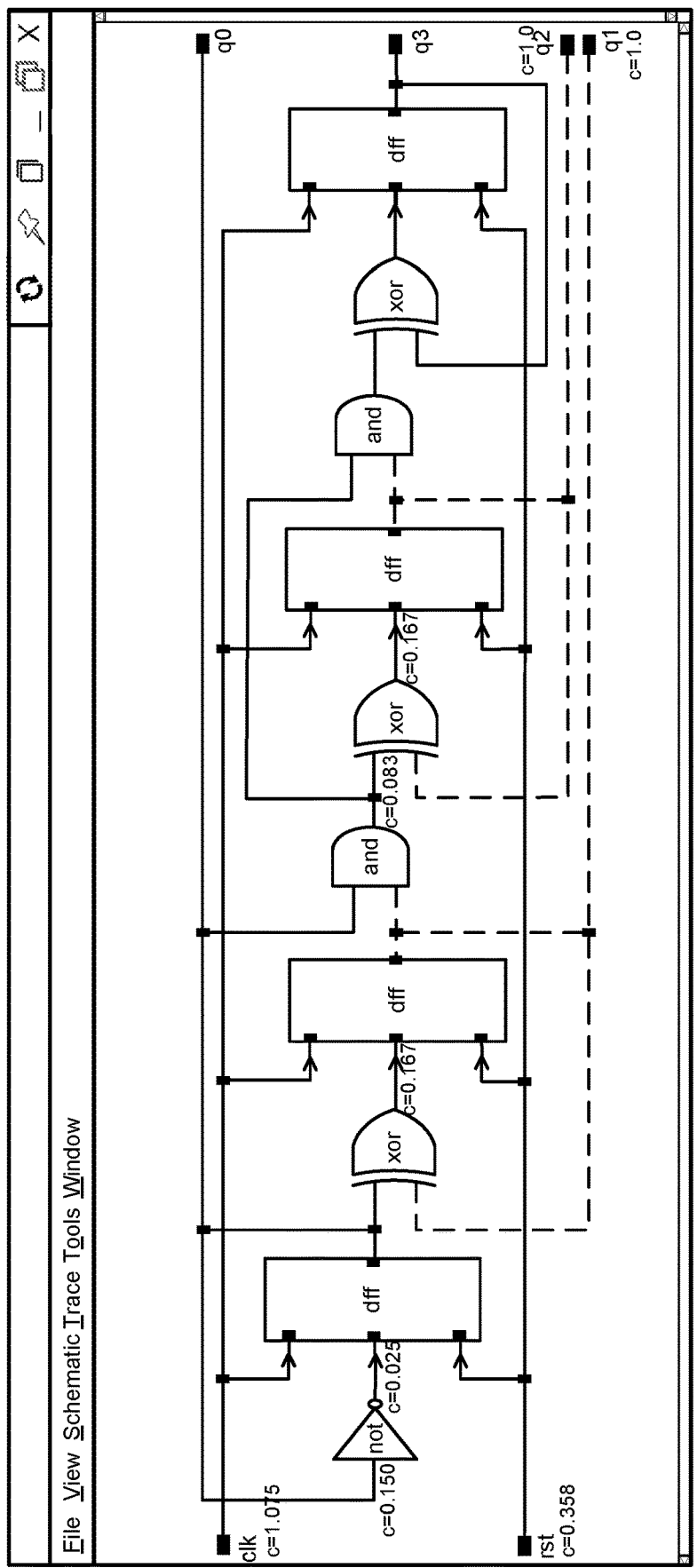
FIGS. 5E and 5F are screen shots showing cause rank and joint rank for a different set of faults for the 4-bit counter of FIG. 5A, in accordance with some embodiments of the present disclosure.
Figure 5F:
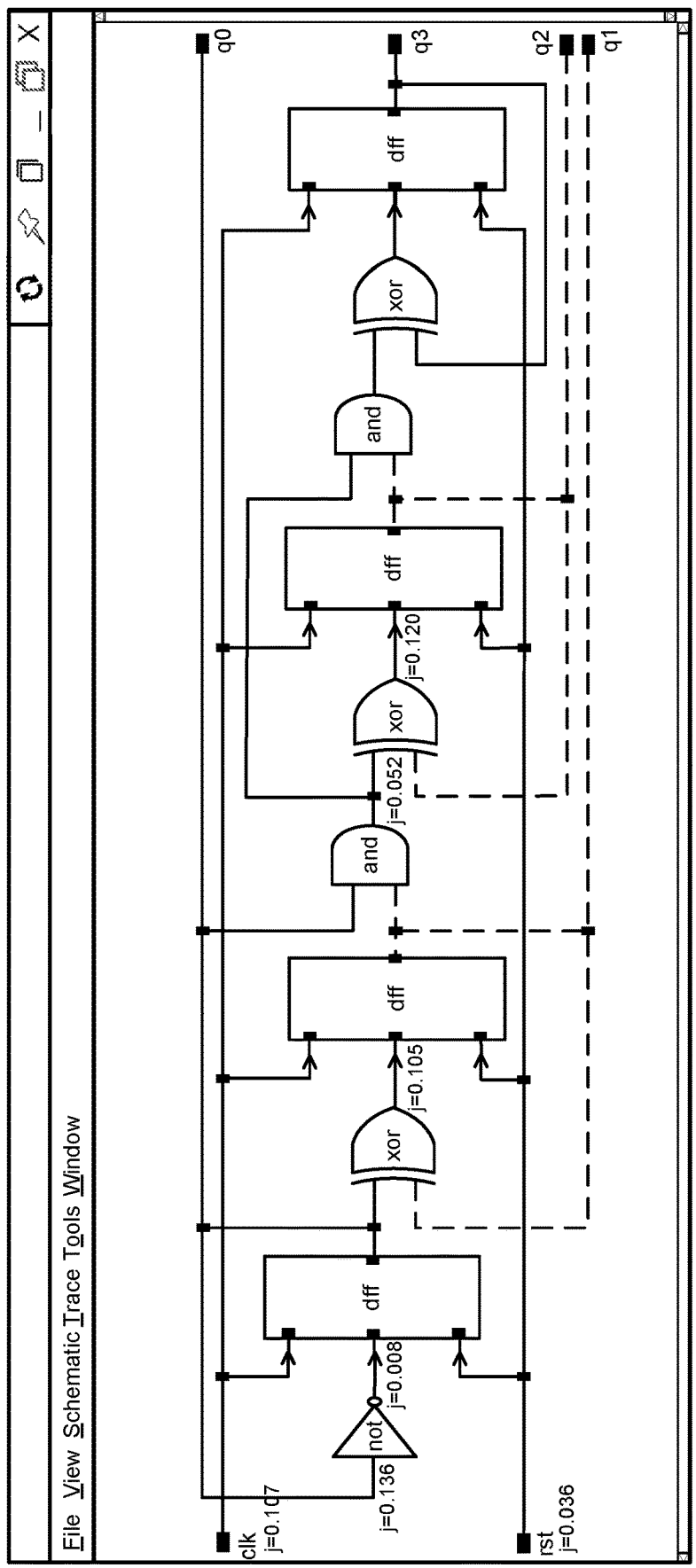

FIGS. 5E and 5F show cause rank and joint rank, but for a situation where two faults have been identified. In this example, the output signals q1 and q2 are both identified as faulty, as indicated by the dashed lines. The fault rank scores from FIG. 5B are not changed. However, the cause rank scores in FIG. 5C are updated as shown in FIG. 5E, and the resulting joint rank scores are also changed as shown in FIG. 5F. In this example, only the cause rank c was updated, but the fault rank f could also be updated.

The information described in FIG. 5 may be presented in different ways. In the screen shots of FIG. 5, the different ranks are overlaid on the design of the integrated circuit itself. The system may also produce listings or elements, for example in decreasing order of joint rank or the other ranks. Color coding or other highlights may also be used, for example to identify the known faults and/or to identify the elements with the highest rankings. This information may help a user to debug the circuit for the confirmed faults.

Figure 6A:
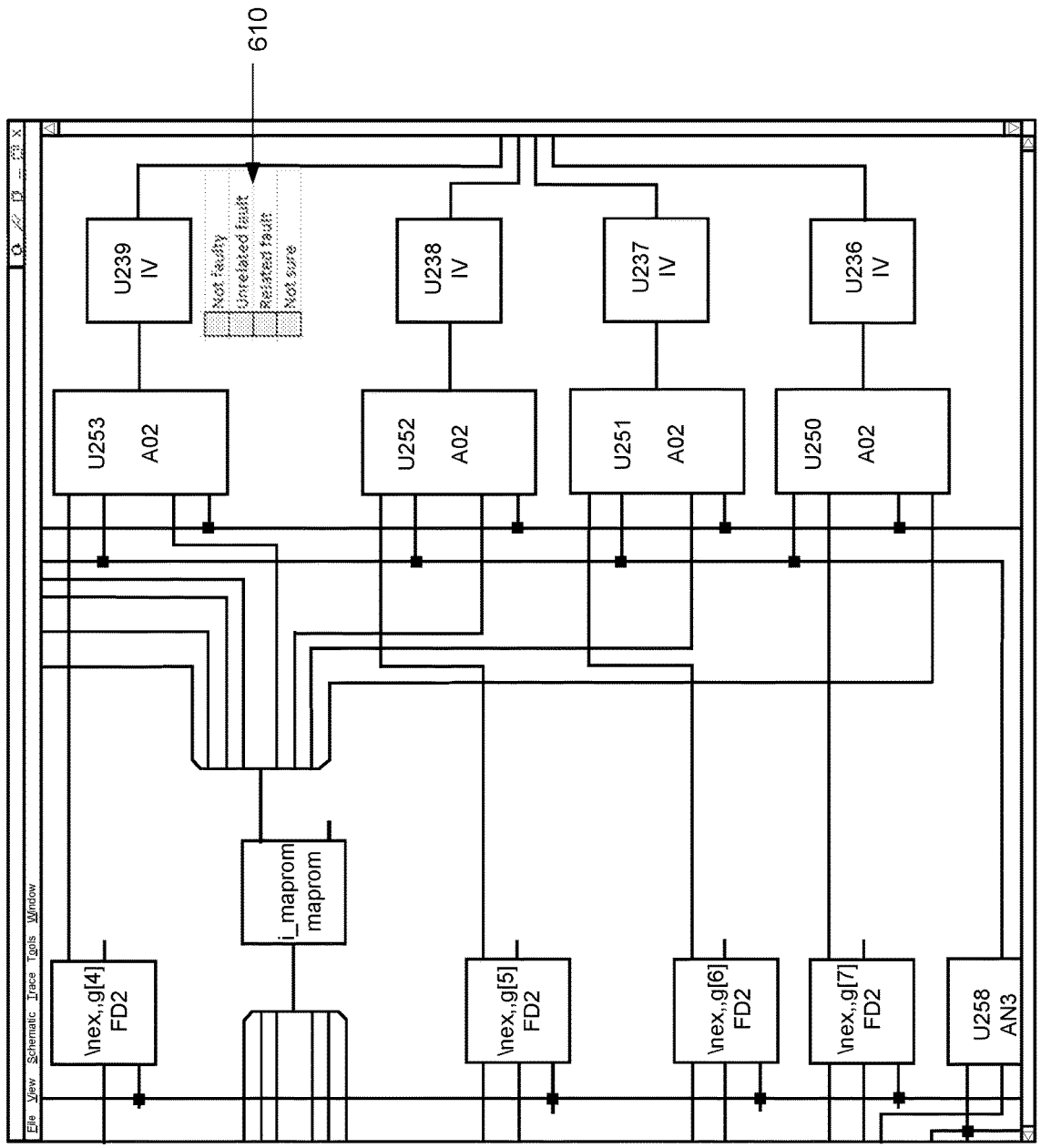
FIG. 6A is a screen shot showing a pop-up menu for user identification of faults, in accordance with some embodiments of the present disclosure.

The user interface may also allow the user to conveniently provider user feedback. For example, the user interface may allow the user to input the location of known faults within the design. FIG. 6A is a screen shot showing the design of an integrated circuit. When the cursor hovers over an element, a pull-down menu 610 is displayed with choices of not faulty, unrelated fault, related fault and not sure. If the user selects "not faulty", the fault rank f and cause rank c are decremented or set to zero. If the user selects "unrelated fault", the fault rank f is incremented but the cause rank c is not changed. For "related fault", the cause rank c is updated to a value of 1. If "not sure", then no changes are made.

Figure 6B:
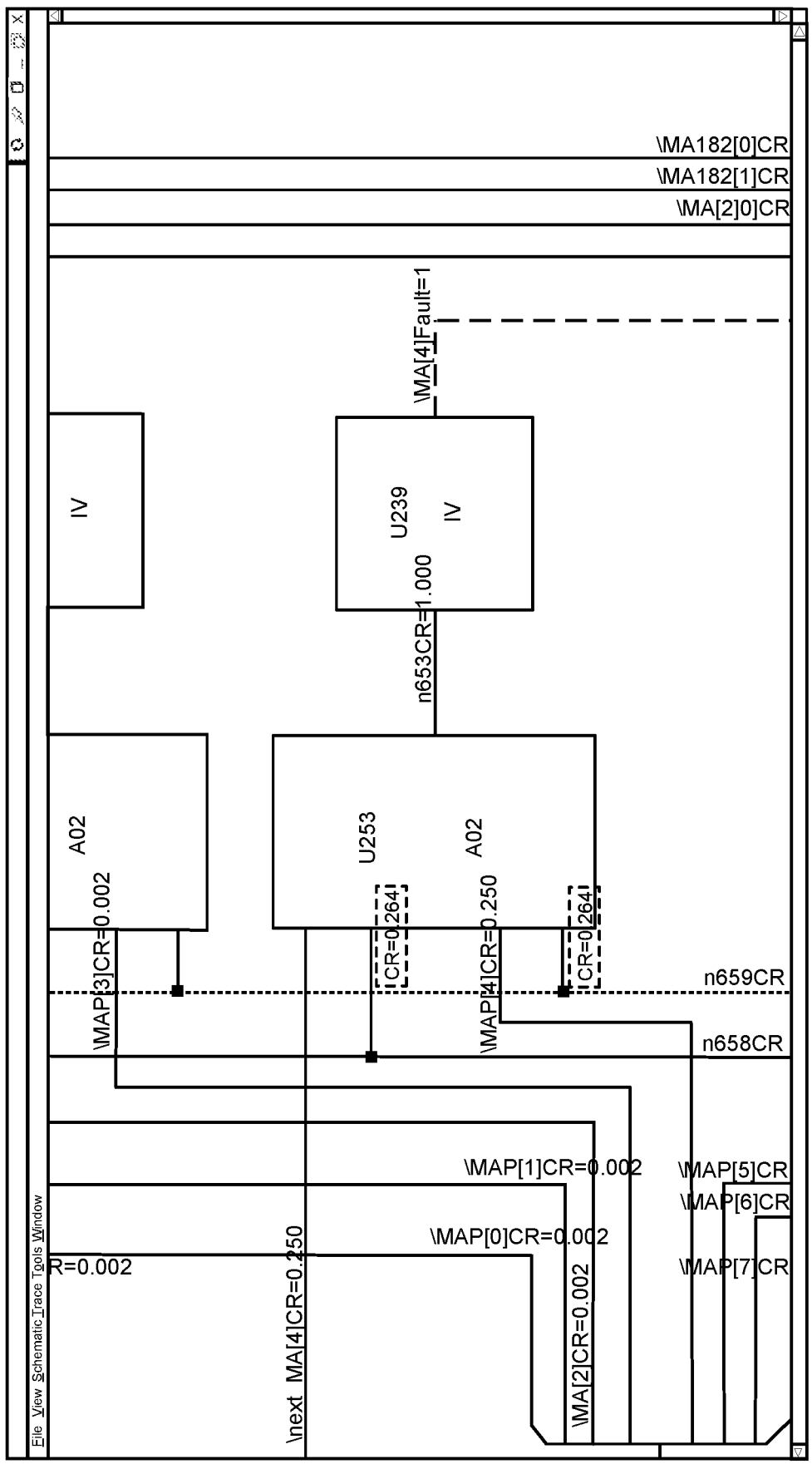
FIG. 6B is a screen shot showing joint rank based on user-identified faults, in accordance with some embodiments of the present disclosure.

In this example, the user selects "related fault", and the cause rank and joint rank are updated as shown in FIG. 6B. The fault is confirmed for signal "\MA[4]", as indicated by the label "Fault=1" following "\MA[4]". The faulty signal is shown as a dashed line in FIG. 6B. The joint probability ranking scores are labeled as CR following the signal name in this example. The highest CR scores are identified by the dashed boxes with CR=0.264. Color and other identifiers may also be used. This tool is helpful, when the circuit graph is complicated and identified faults scattered across the graph, the ranking scores can figure out the mostly likely causes and can interact with debug engineer, and even learn from previous debug experiences to update the prior and conditional probabilities.

Figure 7:
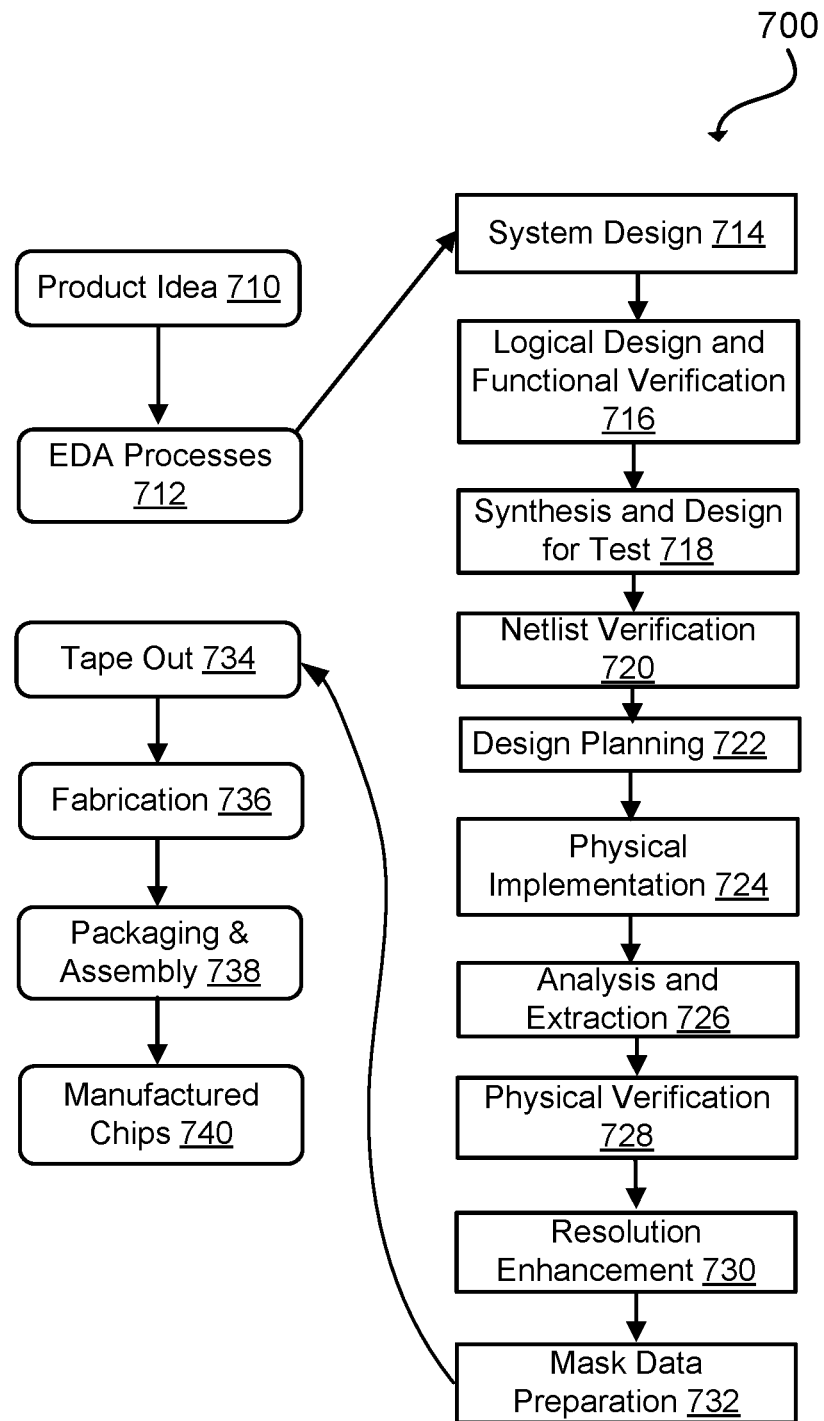
FIG. 7 depicts a flowchart of various processes used during the design and manufacture of an integrated circuit in accordance with some embodiments of the present disclosure.

FIG. 7 illustrates an example set of processes 700 used during the design, verification, and fabrication of an article of manufacture such as an integrated circuit to transform and verify design data and instructions that represent the integrated circuit. Each of these processes can be structured and enabled as multiple modules or operations. The term 'EDA' signifies the term 'Electronic Design Automation.' These processes start with the creation of a product idea 710 with information supplied by a designer, information which is transformed to create an article of manufacture that uses a set of EDA processes 712. When the design is finalized, the design is taped-out 734, which is when artwork (e.g., geometric patterns) for the integrated circuit is sent to a fabrication facility to manufacture the mask set, which is then used to manufacture the integrated circuit. After tape-out, a semiconductor die is fabricated 736 and packaging and assembly processes 738 are performed to produce the finished integrated circuit 740.

Specifications for a circuit or electronic structure may range from low-level transistor material layouts to high-level description languages. A high-level of representation may be used to design circuits and systems, using a hardware description language ('HDL') such as VHDL, Verilog, SystemVerilog, SystemC, MyHDL or OpenVera. The HDL description can be transformed to a logic-level register transfer level ('RTL') description, a gate-level description, a layout-level description, or a mask-level description. Each lower representation level that is a more detailed description adds more useful detail into the design description, for example, more details for the modules that include the description. The lower levels of representation that are more detailed descriptions can be generated by a computer, derived from a design library, or created by another design automation process. An example of a specification language at a lower level of representation language for specifying more detailed descriptions is SPICE, which is used for detailed descriptions of circuits with many analog components. Descriptions at each level of representation are enabled for use by the corresponding tools of that layer (e.g., a formal verification tool). A design process may use a sequence depicted in FIG. 7. The processes described by be enabled by EDA products (or tools).

During system design 714, functionality of an integrated circuit to be manufactured is specified. The design may be optimized for desired characteristics such as power consumption, performance, area (physical and/or lines of code), and reduction of costs, etc. Partitioning of the design into different types of modules or components can occur at this stage.

During logic design and functional verification 716, modules or components in the circuit are specified in one or more description languages and the specification is checked for functional accuracy. For example, the components of the circuit may be verified to generate outputs that match the requirements of the specification of the circuit or system being designed. Functional verification may use simulators and other programs such as testbench generators, static HDL checkers, and formal verifiers. In some embodiments, special systems of components referred to as 'emulators' or 'prototyping systems' are used to speed up the functional verification.

During synthesis and design for test 718, HDL code is transformed to a netlist. In some embodiments, a netlist may be a graph structure where edges of the graph structure represent components of a circuit and where the nodes of the graph structure represent how the components are interconnected. Both the HDL code and the netlist are hierarchical articles of manufacture that can be used by an EDA product to verify that the integrated circuit, when manufactured, performs according to the specified design. The netlist can be optimized for a target semiconductor manufacturing technology. Additionally, the finished integrated circuit may be tested to verify that the integrated circuit satisfies the requirements of the specification.

During netlist verification 720, the netlist is checked for compliance with timing constraints and for correspondence with the HDL code. During design planning 722, an overall floor plan for the integrated circuit is constructed and analyzed for timing and top-level routing.

During layout or physical implementation 724, physical placement (positioning of circuit components such as transistors or capacitors) and routing (connection of the circuit components by multiple conductors) occurs, and the selection of cells from a library to enable specific logic functions can be performed. As used herein, the term 'cell' may specify a set of transistors, other components, and interconnections that provides a Boolean logic function (e.g., AND, OR, NOT, XOR) or a storage function (such as a flipflop or latch). As used herein, a circuit 'block' may refer to two or more cells. Both a cell and a circuit block can be referred to as a module or component and are enabled as both physical structures and in simulations. Parameters are specified for selected cells (based on 'standard cells') such as size and made accessible in a database for use by EDA products.

During analysis and extraction 726, the circuit function is verified at the layout level, which permits refinement of the layout design. During physical verification 728, the layout design is checked to ensure that manufacturing constraints are correct, such as DRC constraints, electrical constraints, lithographic constraints, and that circuitry function matches the HDL design specification. During resolution enhancement 730, the geometry of the layout is transformed to improve how the circuit design is manufactured.

During tape-out, data is created to be used (after lithographic enhancements are applied if appropriate) for production of lithography masks. During mask data preparation 732, the 'tape-out' data is used to produce lithography masks that are used to produce finished integrated circuits.

A storage subsystem of a computer system (such as computer system 800 of FIG. 8) may be used to store the programs and data structures that are used by some or all of the EDA products described herein, and products used for development of cells for the library and for physical and logical design that use the library.

Figure 8:
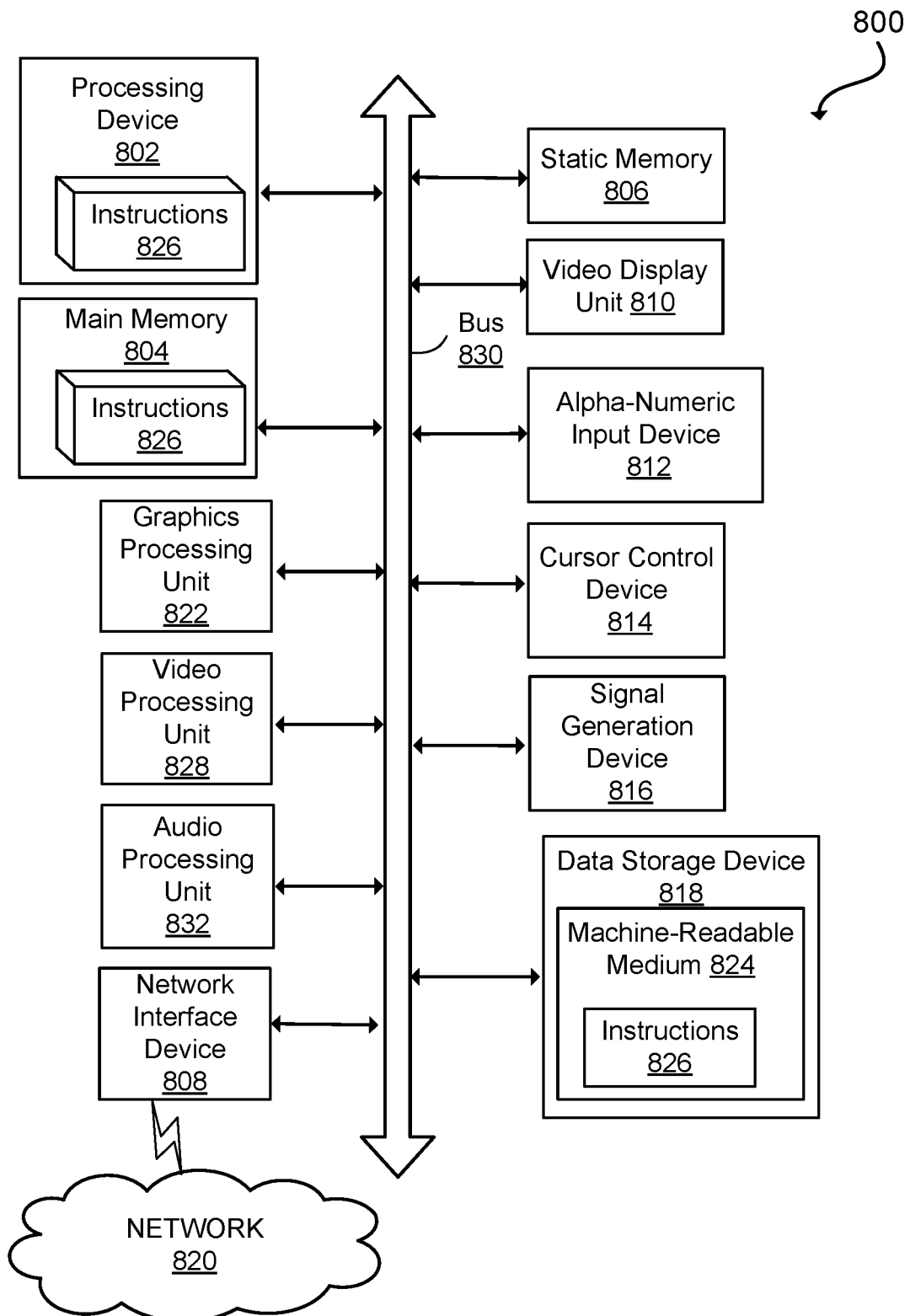
FIG. 8 depicts a diagram of an example computer system in which embodiments of the present disclosure may operate.

FIG. 8 illustrates an example machine of a computer system 800 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 800 includes a processing device 802, a main memory 804 (e.g., read-only memory (ROM), flash memory, dynamic random access memory (DRAM) such as synchronous DRAM (SDRAM), a static memory 806 (e.g., flash memory, static random access memory (SRAM), etc.), and a data storage device 818, which communicate with each other via a bus 830.

Processing device 802 represents one or more processors such as a microprocessor, a central processing unit, or the like. More particularly, the processing device may be complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 802 may also be one or more special-purpose processing devices such as an application specific integrated circuit (ASIC), a field programmable gate array (FPGA), a digital signal processor (DSP), network processor, or the like. The processing device 802 may be configured to execute instructions 826 for performing the operations and steps described herein.

The computer system 800 may further include a network interface device 808 to communicate over the network 820. The computer system 800 also may include a video display unit 810 (e.g., a liquid crystal display (LCD) or a cathode ray tube (CRT)), an alphanumeric input device 812 (e.g., a keyboard), a cursor control device 814 (e.g., a mouse), a graphics processing unit 822, a signal generation device 816 (e.g., a speaker), graphics processing unit 822, video processing unit 828, and audio processing unit 832.

The data storage device 818 may include a machine-readable storage medium 824 (also known as a non-transitory computer-readable medium) on which is stored one or more sets of instructions 826 or software embodying any one or more of the methodologies or functions described herein. The instructions 826 may also reside, completely or at least partially, within the main memory 804 and/or within the processing device 802 during execution thereof by the computer system 800, the main memory 804 and the processing device 802 also constituting machine-readable storage media.

In some implementations, the instructions 826 include instructions to implement functionality corresponding to the present disclosure. While the machine-readable storage medium 824 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine and the processing device 802 to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm may be a sequence of operations leading to a desired result. The operations are those requiring physical manipulations of physical quantities. Such quantities may take the form of electrical or magnetic signals capable of being stored, combined, compared, and otherwise manipulated. Such signals may be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may include a computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform the method. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. Where the disclosure refers to some elements in the singular tense, more than one element can be depicted in the figures and like elements are labeled with like numerals. The disclosure and drawings are, accordingly, to be regarded in an illustrative sense rather than a restrictive sense.

What is claimed is:

1. A non-transitory computer readable medium comprising stored instructions, which when executed by a processor, cause the processor to perform a method comprising:

accessing a graph that represents signal flow through a design of an integrated circuit, the graph comprising a plurality of graph elements;

constructing a first propagation model for propagation of faults through the graph, the first propagation model comprising local propagation models for propagation of faults through the graph elements;

modeling propagation of a known fault backward through the graph using the first propagation model to develop a causality ranking of the graph elements as possible causes of the known fault; and based on the modeled fault propagation, causing display of information indicative of the causality ranking in a user interface that shows the design of the integrated circuit.

2. The non-transitory computer readable medium of claim 1, wherein the first propagation model comprises fault ranks, cause ranks and joint ranks for signal flows through the graph; wherein the fault ranks represent relative measures of prior probabilities that downstream signals are faulty given probabilities that upstream driver signals are faulty, the cause ranks represent relative measures of conditional probabilities that upstream driver signals are faulty given probabilities that downstream signals are faulty, and the joint ranks are functions of the fault ranks and the cause ranks.

3. The non-transitory computer readable medium of claim 2, wherein the local propagation models comprise local back propagation models for propagation of the cause ranks backward through the graph elements.

4. The non-transitory computer readable medium of claim 2, wherein the local propagation models comprise local forward propagation models for propagation of the fault ranks forwards through the graph elements.

5. The non-transitory computer readable medium of claim 2, wherein the joint ranks represent relative measures of joint probabilities that downstream signals and corresponding upstream driver signals are both faulty.

6. The non-transitory computer readable medium of claim 1, wherein the plurality of graph elements comprise nodes and edges, the nodes of the graph represent cells and nets in the design of the integrated circuit, the edges of the graph represent signals flowing between the cells and nets, and the local propagation models are for propagation of faults through individual nodes.

7. The non-transitory computer readable medium of claim 1, wherein the first propagation model comprises cause ranks for signal flows through the graph; the cause ranks represent relative measures of conditional probabilities that upstream driver signals are faulty given probabilities that downstream signals are faulty; and the local propagation models comprise local back propagation models for propagation of the cause ranks backward through individual nodes of the graph according to:

$$p(y \mid x_i^L) = \frac{1}{M} \sum_{j=1,N} p(y \mid x_j^{L+1})$$

where $p(y|x_j^{L+1})$ are cause ranks for N output signals $x_j^{L+1}$, j=1 to N, from the node for a fault at y, and $p(y|x_i^L)$ are cause ranks for M input signals $x_i^L$, i=1 to M, to the node for the fault at y.

8. The non-transitory computer readable medium of claim 1, wherein the first propagation model comprises fault ranks for signal flows through the graph; the fault ranks represent relative measures of prior probabilities that downstream signals are faulty given probabilities that upstream driver signals are faulty; and the local propagation models comprise local forward propagation models for propagation of the fault ranks forwards through individual nodes of the graph according to:

$$p(x_i^{L+1}) = \frac{1}{N}\left[d + (1-d)\frac{1}{M}\sum_{j=1}^{M}p(x_j^L)\right]$$

where $p(x_j^L)$ are fault ranks for M input signals $x_j^L$, j=1 to M, to the node, $p(x_i^{L+1})$ are fault ranks for N output signals $x_i^{L+1}$, i=1 to N, from the node, and d is a parameter.

9. A method comprising:
   modeling, by a processor, propagation of a known fault backward through a graph, wherein the graph comprises graph elements and represents signal flow through a design of an integrated circuit, and the modelled propagation results in a causality ranking of the graph elements as possible causes of the known fault; and
   based on the modeled fault propagation, causing display of information indicative of the causality ranking in a user interface that shows the design of the integrated circuit.

10. The method of claim 9, wherein:
    modeling propagation of the known fault through the graph comprises updating a causality metric for the graph elements, wherein the causality ranking is based on the causality metrics; and
    the display of information indicative of the causality ranking comprises an overlay of the causality metrics on the design of the integrated circuit.

11. The method of claim 9, wherein:
    modeling propagation of the know n fault through the graph comprises updating causality metrics for the graph elements, wherein the causality ranking is based on the causality metrics; and
    the display of information indicative of the causality ranking comprises a listing of graph elements in an order based on the causality metrics of the corresponding graph elements.

12. The method of claim 9, further comprising:
    from the user interface, receiving user input of a location of the known fault within the design, wherein modeling propagation of the known fault is responsive to receiving the user input.

13. The method of claim 12, wherein receiving user input comprises, when a user hovers over a circuit element in the design, causing display of a pull-down menu with choices that include: not faulty, and faulty.

14. The method of claim 12, wherein modeling propagation of the known fault comprises calculating fault ranks and cause ranks for signal flows through the graph; wherein the fault ranks represent relative measures of prior probabilities that downstream signals are faulty given probabilities that upstream driver signals are faulty, and the cause ranks represent relative measures of conditional probabilities that upstream driver signals are faulty given probabilities that downstream signals are faulty, the method further comprising:
    receiving further user input that the known fault is a related fault; and
    responsive to receiving the user input, updating the cause ranks and the fault ranks.

15. The method of claim 12, wherein modeling propagation of the known fault comprises calculating fault ranks and cause ranks for signal flows through the graph; wherein the fault ranks represent relative measures of prior probabilities that downstream signals are faulty given probabilities that upstream driver signals are faulty, and the cause ranks represent relative measures of conditional probabilities that upstream driver signals are faulty given probabilities that downstream signals are faulty, the method further comprising:
    receiving further user input that the known fault is an unrelated fault; and
    responsive to receiving the user input, updating the fault ranks but not the cause ranks.

16. A system comprising:
    a memory storing instructions; and
    a processor, coupled with the memory and to execute the instructions, the instructions when executed cause the processor to:
        access a graph that represents signal flow through a design of an integrated circuit, the graph comprising a plurality of graph elements;
        model propagation of a known fault backward through the graph using local propagation models for propagation of faults through the graph elements to develop a causality ranking of the graph elements as possible causes of the known fault; and
        based on the modeled fault propagation, causing display of information indicative of the causality ranking in a user interface that shows the design of the integrated circuit.

17. The system of claim 16, wherein at least some of the local propagation models comprise in-graph machine learning models characterized by parameters, the processor further training the parameters based on a user's process for designing the integrated circuit.

18. The system of claim 17, wherein the in-graph machine learning models for a current design are trained on data collected from multiple designs.

19. The system of claim 16, wherein at least some of the local propagation models are hierarchical.

20. The system of claim 16, wherein the user interface is a user interface for at least one of place and route of the integrated circuit, functional verification of the integrated circuit, and timing analysis of the integrated circuit.

* * * * *